United States Patent Office 2,704,295
Patented Mar. 15, 1955

2,704,295

AROMATIC HYDROCARBON SULFONATION

Everett E. Gilbert, Flushing, and Silvio L. Giolito, New York, N. Y., assignors to Allied Chemical & Dye Corporation, New York, N. Y., a corporation of New York No Drawing. Application July 11, 1952,
Serial No. 298,474

12 Claims. (Cl. 260—505)

This invention relates to a process for sulfonating mononuclear aromatic hydrocarbons, and more particularly to a process for direct sulfonation of such hydrocarbons with sulfur trioxide in which the formation of sulfones is minimized.

Sulfonated mononuclear aromatic hydrocarbons are useful for a number of purposes including their use as starting materials in the production of the corresponding hydroxy compounds by fusion of the sulfonated aromatic hydrocarbon with caustic soda. In this manner benzene monosulfonic acid may be converted into phenol, benzene disulfonic acid may be converted into resorcinol, etc.

Aromatic hydrocarbons such as benzene, toluene, xylene and the like have been sulfonated in the past to produce the corresponding mono and disulfonic acids, by reacting the hydrocarbons with sulfonating agents such as sulfuric acid, oleum, etc. In all such processes, water is formed during the reaction, which prevents the reaction from going to completion, thus resulting in waste of aromatic compounds and of sulfonating agent, and requiring additional processing steps to remove residual sulfuric acid.

Direct sulfonation of such hydrocarbons with sulfur trioxide, which theoretically should obviate the above difficulties, since no water is liberated in the reaction, unfortunately has been found to yield, not only the aromatic hydrocarbon sulfonic acids, but also objectionably large quantities of aromatic sulfones. The quantities of sulfones formed in the reaction in liquid phase may be as high as 30% in some cases. The quantities of sulfones are usually higher in benzene sulfonations and in the case of compounds having fewer substituents on the benzene nucleus, than in the case of highly substituted benzenes. Thus, in the liquid phase reaction of benzene with $SO_3$, sulfone formation may range from, say, 10% to 30% or more, while in the toluene reaction the sulfone formation is usually less, although sometimes as high as 24%. In the xylene-$SO_3$ reaction sulfone formation is usually still lower, although it is often present to a troublesome degree, for example in amounts of 7.6% or more.

The presence of sulfones in the aromatic mononuclear sulfonates is objectionable not only because of the reduction in yield of the desired sulfonates but their presence renders the sulfonated product less desirable or even unacceptable in some cases for use in the caustic fusion process for the production of hydroxy compounds such as phenol and resorcinol since the presence of sulfones renders the fusion mass more viscous, and tends to result in an odorous product, which is particularly objectionable in the case of resorcinol.

Various methods have been tried for reducing objectionable sulfone formation in the direct reaction of benzene compounds with sulfur trioxide, for example by carrying out the reaction in the presence of solvents such as chloroform or liquid sulfur dioxide, or by using as sulfonating agents sulfur trioxide complexes with compounds such as dioxane. Such procedures have produced aromatic sulfonate products with lowered sulfone content but costs of recovery of the solvent or complexing agent are so high as to render such processes commercially unattractive.

It is an object of the present invention to provide a process for the direct sulfonation of mononuclear aromatic hydrocarbons with sulfur trioxide in which the formation of aromatic sulfones is minimized.

This and other objects are accomplished according to our invention wherein aromatic mononuclear sulfonic acids are prepared by reacting mononuclear aromatic hydrocarbons with sulfur trioxide in substantially anhydrous state in the presence of a small quantity of a sulfone formation inhibiting agent selected from the lower saturated aliphatic acids, containing from 2 to 8 carbon atoms, their anhydrides, their per acids, and the reaction products of any of the foregoing with sulfur trioxide.

In carrying out the process according to our invention, a mononuclear aromatic compound, sulfur trioxide and a small quantity of the sulfone-formation inhibitor are mixed in any convenient manner which assures presence of the inhibitor when $SO_3$ and aromatic compound contact each other.

Upon bringing the reactants together, reaction is initiated immediately and is exothermic so that it may be desirable to provide means for removing heat from the reaction or to conduct the mixing slowly so that the temperature does not rise unduly.

After the desired quantities of reactants have been mixed, the mixture may be digested, if desired, for a short period to insure completion of the sulfonation reaction. The resulting product is substantially entirely the corresponding aromatic monosulfonate (if the quantity of $SO_3$ used is approximately 1 mol per mol of aromatic compound), uncontaminated by appreciable quantities of sulfones, the product usually containing not more than about 7% of sulfones, more often less than about 3% sulfones based on the reaction product minus the inhibitor used. The disulfonic acids may be prepared, if desired, without isolation of the monosulfonic acids, by continuing the sulfonation with additional quantities of $SO_3$ under conditions adapted to introduce another sulfonic acid group into the benzene ring.

The aromatic mononuclear compounds which may be sulfonated according to our process include those which have at least one replaceable hydrogen atom on the benzene ring, for example, benzene, toluene, the xylenes, chlorobenzene and the like.

The sulfur trioxide used, may be in the gaseous or liquid state, but for ease of handling, we prefer to utilize liquid sulfur trioxide which has been stabilized.

The inhibitor of sulfone formation may be any of the lower saturated aliphatic acids having 2 or more carbon atoms, i. e. the lower alkanoic acids such as acetic, propionic, butyric, valeric, caproic, and caprylic acids or their per acids, or their anhydrides. Formic acid is inoperative. Also effective are the reaction products of the indicated acids with sulfur trioxide including such compounds as the acyl sulfates, the mono and disulfo lower alkanoic acids, the acyl sulfo alkanoic acids, sulfonyl dialkanoates, sulfonyl dialkanoic acids, disulfodehydro alkanoic acids and the like reaction products which form on contact of the indicated lower aliphatic acid, per acid or anhydride with $SO_3$.

The quantity of inhibitor used to minimize sulfone formation should be at least about 2% by weight based on the weight of the aromatic compound to be sulfonated. It is of course desirable to use as small a quantity as possible consistent with effective inhibition of sulfone formation, since greater quantities are wasteful of $SO_3$ which is used up in sulfonating the inhibitor material. Usually quantities between about 2% and about 6% on the above basis are sufficient.

The temperature of the reaction is not critical. In liquid phase reactions using $SO_3$ vapor as the sulfonating agent, the temperature should be such as to maintain the liquid phase of the reactants, so that in such case the temperature will depend to some extent on the particular aromatic compound being sulfonated and on its boiling point, and on the pressure conditions employed in the reaction. In our preferred procedure, using liquid sulfur trioxide as the sulfonating agent, we find it convenient to initiate the reaction at a temperature somewhat below the boiling point of the liquid sulfur trioxide (44.8° C.) but above its freezing point (16.8° C.), conveniently at about room temperature (20–25° C.), and to allow it to rise somewhat during and after the mixing of the reactants, for example to as high as about 80° C.

While the effective inhibitors of sulfone formation are the acids, per acids and anhydrides and their reaction products with SO₃ as defined, the inhibitor will usually be introduced into the presence of the reactants in the form of the acid, or per acid or anhydride which then inevitably reacts, at least to some extent, with SO₃ when contact with this compound takes place. It may be added either to the aromatic compound or to the SO₃ before the reactants are mixed.

The reactants themselves, i. e. the SO₃ and the aromatic hydrocarbons, either one or both of which may be premixed with inhibitor, may be mixed with each other in any convenient manner or order of addition. Thus sulfone inhibition is obtained whether SO₃ is added to the aromatic compound, or whether aromatic compound is added to the SO₃, or whether the two reactants are mixed by simultaneous addition. However, when using stabilized liquid sulfur trioxide, we prefer to add the aromatic compound to the liquid SO₃ rather than to mix the reactants in the reverse order, as this procedure results in a greater minimizing of the sulfone formation than does the reverse order of addition. In any event the sulfone formation which takes place in the presence of the inhibitor as defined, is less than that which occurs under otherwise similar conditions in the absence of such inhibitor.

The following specific examples further illustrate our invention:

*Example 1*

Eighty parts (1 mol) of stabilized liquid sulfur trioxide was added dropwise over a period of 35 minutes to a mixture of 78 parts (1 mol) of benzene and 19 parts of glacial acetic acid in a mechanically stirred 3-necked reaction flask equipped with dropping funnel and thermometer and cooled with an external ice bath to maintain the temperature at 15-25° C. during the addition period. After complete addition of SO₃, the external cooling was discontinued while continuing agitation for a digestion period of 15 minutes. The reaction product amounted to 177 parts of essentially benzene monosulfonic acid which was found on analysis to contain only 3.5% of sulfones based on the weight of the product minus the acetic acid.

A run carried out in a manner and under conditions which were identical in all essential respects with that described in Example 1 above except that no acetic acid was employed resulted in a product containing 24.5% of sulfones.

*Example 2*

A mixture of 78 parts (1 mol) of benzene and 3.9 parts of glacial acetic acid was added dropwise over a period of 45 minutes to 80 parts (1 mol) of stabilized liquid sulfur trioxide in the apparatus described in Example 1. During the addition the temperature varied as indicated below.

| Time (minutes): | Temperature, ° C. |
| --- | --- |
| 0 | 20 |
| 15 | 35 |
| 30 | 50 |
| 45 | 30 |

The resulting crude product, essentially of benzene monosulfonic acid, amounted to 156 parts and showed on analysis a sulfone content of 2.4% based on the weight of the product minus acetic acid.

*Example 3*

The procedure of Example 2 was repeated except that the addition period of zenzene-acetic acid mixture to liquid SO₃ was 20 minutes at 40° C. to 65° C., and after addition, the reaction product was digested 30 minutes at 70 to 80° C. The crude product amounted to 161 parts, consisting essentially of benzene monosulfonic acid, and contained 2.3% of sulfone based on the weight of the product minus acetic acid.

*Example 4*

The procedure of Example 2 was repeated except that the quantity of glacial acetic acid was reduced to 1.6 parts and the addition of the benzene-acetic acid mixture to liquid SO₃ was carried out over a period of 24 minutes in the temperature range of 20° C. to 43° C. The crude reaction product amounted to 157.5 parts, consisting essentially of benzene monosulfonic acid. It contained 3.4% of sulfones based on the weight of the product minus acetic acid.

*Example 5*

Using the apparatus described in Example 1, to a mixture of 80 parts (1 mol) of stabilized liquid SO₃ and 3.9 parts of glacial acetic acid was added dropwise 78 parts (1 mol) of benzene over a period of 25 minutes at temperatures between 24° C. and 30° C. The resulting reaction product amounted to 160.5 parts consisting essentially of benzene monosulfonic acid and contained 2.5% of sulfones based on the weight of the product minus acetic acid.

*Example 6*

A larger scale run was made following the procedure described in Example 3, in which a mixture of 390 parts (5 mols) of benzene and 19.5 parts of glacial acetic acid were added to 452 parts (5.7 mols) of stabilized liquid SO₃ over a three hour period in the temperature range from 30° C. to 50° C. The reaction mixture was then digested 1 hour at 85° C. The resulting crude product consisting essentially of benzene monosulfonic acid amounted to 853.4 parts, and contained 1.9% of sulfones based on the weight of the reaction product minus acetic acid.

*Example 7*

Using the apparatus and procedure described in Example 1, 92.3 parts (1.15 mols) of stabilized liquid sulfur trioxide were added to a mixture of 92 parts (1 mol) of toluene and 4.6 parts of glacial acetic acid dropwise over a period of 13 minutes while maintaining the mixture within the temperature range of 30° C. to 55° C. After addition was complete, the reaction mixture was digested for 20 minutes at 30 to 55° C. The resulting crude reaction product consisting essentially of toluene monosulfonic acid amounted to 187 parts and contained 5% of sulfones based on the weight of the reaction product minus acetic acid.

*Example 8*

4 parts of propionic acid was dissolved in 78 parts (1 mol) of benzene and the mixture was added dropwise to 100 parts (1.25 mols) of stabilized liquid sulfur trioxide over a period of 28 minutes at temperatures rising from 33° C. to 57° C. The mixture was then digested for ½ hour at 85° C. The resulting product consisted essentially of benzene monosulfonic acid and contained 2.6% of sulfones based on the total weight of the reaction product less the weight of propionic acid used.

*Example 9*

5 parts of glacial acetic acid was dissolved in 100 parts (.95 mol) of para xylene. To this solution, 83 parts (1.03 mols) of stabilized liquid sulfur trioxide was added dropwise over a period of 15 minutes at temperatures rising from 25° C. to 72° C. The resulting product, consisting essentially of para xylene monosulfonic acid, contained 3.2% of sulfones. A parallel run containing no acetic acid resulted in a product containing 7.6% of sulfones, based on the total weight of reaction product.

*Example 10*

Eighty parts of stabilized liquid sulfur trioxide were added dropwise over a 30 minute period to 78 parts of benzene and 7.8 parts of acetic anhydride at temperatures of between 15° C. and 20° C. The resulting reaction product amounted to 164 parts consisting essentially of benzene monosulfonic acid, and contained 7.1% of sulfones based on the weight of the product minus the acetic anhydride.

*Example 11*

Eighty parts of stabilized liquid sulfur trioxide were added dropwise over a 30 minute period to 78 parts of benzene and 7.8 parts of per acetic acid (CH₃CO·O·OH) at temperatures between 15° C. and 20° C. The resulting reaction product amounted to 164 parts consisting essentially of benzene monosulfonic acid, and contained 6.4% of sulfones based on the weight of the product minus the per acetic acid.

The stabilized sulfur trioxide employed in the above examples was a commercial product known in the trade as Sulfan "B," Sulfan being a registered trade-mark.

While the above describes the preferred embodiments of the invention, it will be understood that departures

We claim:

1. In a process for sulfonating mononuclear aromatic hydrocarbons selected from the group consisting of benzene, chlorobenzene, toluene and the xylenes with sulfur trioxide in which sulfone formation is minimized, the step which comprises carrying out the sulfonation reaction wholly in the liquid phase in the presence of a small quantity, at least about 2% by weight based on the weight of the hydrocarbon, of an inhibitor selected from the group consisting of saturated lower aliphatic acids, containing from 2 to 8 carbon atoms inclusive, their per acids, their anhydrides and reaction products of the foregoing with sulfur trioxide.

2. In a process for preparing sulfonated mononuclear aromatic hydrocarbons selected from the group consisting of benzene, chlorobenzene, toluence and the xylenes in which sulfone formation is minimized, the steps which comprise contacting said hydrocarbon with liquid sulfur trioxide in the presence of a small quantity, at least about 2% by weight based on the weight of the hydrocarbon, of an inhibitor selected from the group consisting of saturated lower aliphatic acids containing from 2 to 8 carbon atoms inclusive, their per acids and anhydrides and reaction products of the foregoing with sulfur trioxide in the proportions of at least about one mol of $SO_3$ per mol of hydrocarbon.

3. In a process for preparing sulfonated mononuclear aromatic hydrocarbons selected from the group consisting of benzene, chlorobenzene, toluene and the xylenes in which sulfone formation is minimized, the steps which comprise preparing a mixture of said hydrocarbon and a small quantity, at least about 2% by weight based on the weight of the hydrocarbon, of an inhibitor of sulfone formation selected from the group consisting of saturated lower aliphatic acids containing from 2 to 8 carbon atoms inclusive, their per acids and their anhydrides, and adding said mixture to a quantity of liquid sulfur trioxide equal to at least about one mol of $SO_3$ per mol of hydrocarbon.

4. In a process for preparing sulfonated mononuclear aromatic hydrocarbons selected from the group consisting of benzene, chlorobenzene, toluene and the xylenes in which sulfone formation is minimized, the steps which comprise preparing a mixture of said hydrocarbon and a small quantity, at least about 2% by weight based on the weight of the hydrocarbon, of an inhibitor of sulfone formation selected from the group consisting of saturated lower aliphatic acids containing from 2 to 8 carbon atoms inclusive, their per acids and their anhydrides, and adding said mixture to a quantity of liquid sulfur trioxide equal to at least about one mol of $SO_3$ per mol of hydrocarbon at temperatures between about 20° C. and about 80° C.

5. In a process for sulfonating mononuclear aromatic hydrocarbons selected from the group consisting of benzene, chlorobenzene, toluene and the xylenes with sulfur trioxide, in which sulfone formation is minimized, the step which comprises carrying out the sulfonation reaction wholly in the liquid phase in the presence of a small quantity, at least about 2% by weight based on the weight of the hydrocarbon, of an acetic acid reaction product with $SO_3$.

6. In a process for sulfonating benzene with sulfur trioxide, in which sulfone formation is minimized, the step which comprises carrying out the sulfonation reaction wholly in the liquid phase in the presence of a small quantity, at least about 2% by weight, based on the weight of the benzene, of an acetic acid reaction product with $SO_3$.

7. In a process for sulfonating toluene with sulfur trioxide, in which sulfone formation is minimized, the step which comprises carrying out the sulfonation reaction wholly in the liquid phase in the presence of a small quantity, at least about 2% by weight based on the weight of the toluene, of an acetic acid reaction product with $SO_3$.

8. In a process for sulfonating xylene with sulfur trioxide, in which sulfone formation is minimized, the step which comprises carrying out the sulfonation reaction wholly in the liquid phase in the presence of a small quantity, at least about 2% by weight based on the weight of the xylene, of an acetic acid reaction product with $SO_3$.

9. In a process for preparing benzene sulfonic acid in which sulfone formation is minimized, the steps which comprise adding a mixture of benzene and a small quantity, at least about 2% by weight based on the weight of the benzene, of acetic acid to a quantity of liquid sulfur trioxide equal to at least about one mol per mol of benzene at temperatures between about 20° C. and about 50° C.

10. In a process for preparing toluene sulfonic acid in which sulfone formation is minimized, the steps which comprise adding a mixture of toluene and a small quantity, at least about 2% by weight based on the weight of the toluene, of acetic acid to a quantity of liquid sulfur trioxide equal to at least about one mol per mol of toluene at temperatures between about 20° C. and about 50° C.

11. In a process for preparing para xylene sulfonic acid in which sulfone formation is minimized, the steps which comprise adding a mixture of para xylene and a small quantity, at least about 2% by weight based on the weight of the para xylene, of acetic acid to a quantity of liquid sulfur trioxide equal to at least about one mol per mol of para xylene at temperatures between about 20° C. and about 50° C.

12. In a process for preparing benzene sulfonic acid in which sulfone formation is minimized, the steps which comprise adding a mixture of benzene and a small quantity, at least about 2% by weight based on the weight of the benzene, of propionic acid to a quantity of liquid sulfur trioxide equal to at least about one mol per mol of benzene at temperatures between about 20° C. and about 50° C.

References Cited in the file of this patent

UNITED STATES PATENTS

| | | |
|---|---|---|
| 2,199,776 | Becherer | May 7, 1940 |
| 2,220,099 | Guenther et al. | Nov. 5, 1940 |
| 2,394,851 | Flett | Feb. 12, 1946 |
| 2,616,396 | Mammen et al. | Nov. 4, 1952 |

OTHER REFERENCES

"Reactions of $SO_3$" (1948), pages 12 and 13.